Figure 1:
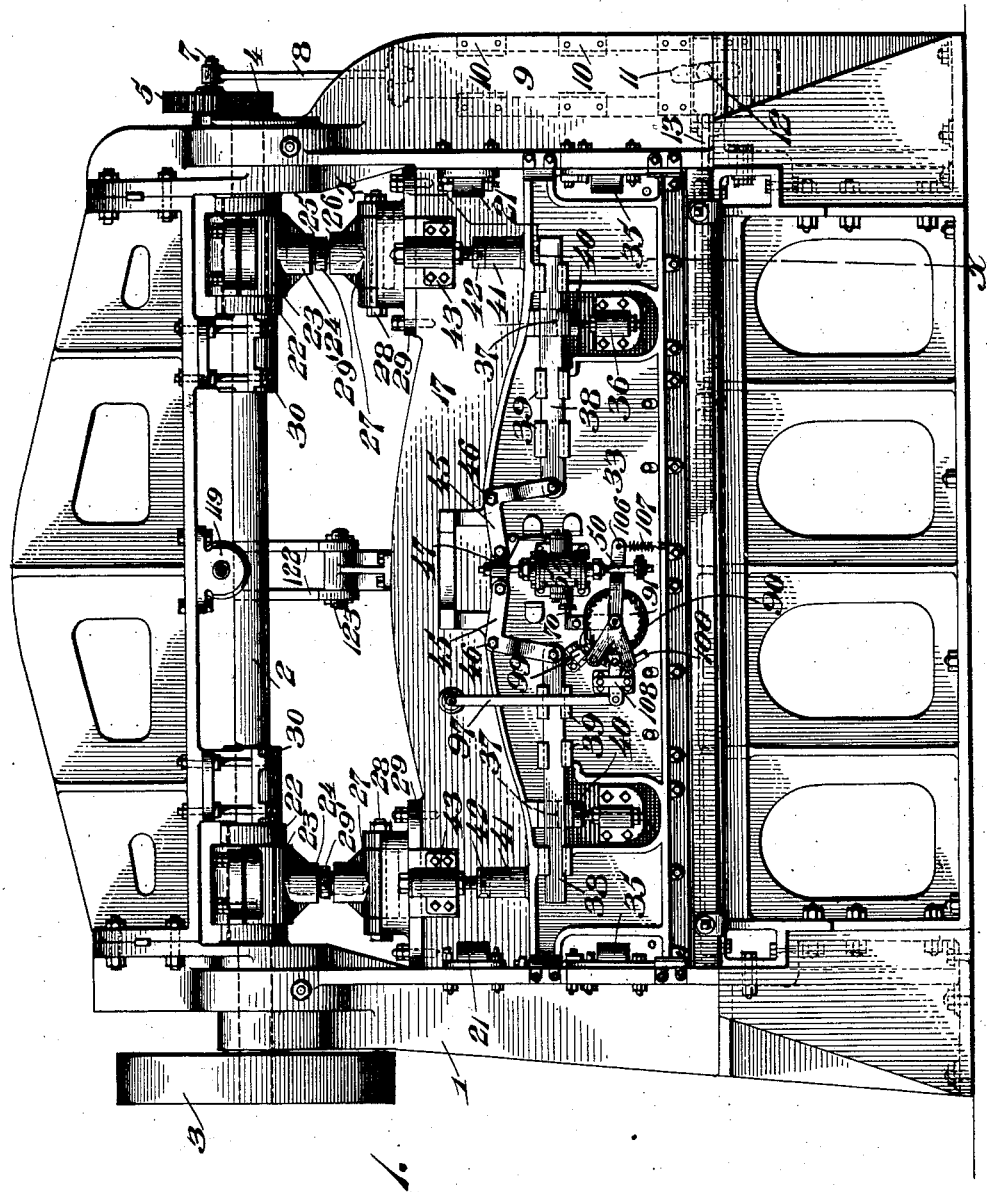

H. E. WHITE.
ATTACHMENT FOR DIAMOND LATH MACHINES.
APPLICATION FILED SEPT. 15, 1908.

919,274.

Patented Apr. 20, 1909.
9 SHEETS—SHEET 1.

Witnesses
P. F. Nagle.
H. G. Dieterich.

Inventor
Herbert E. White.
By Wiedersheim Fairbanks
Attorney

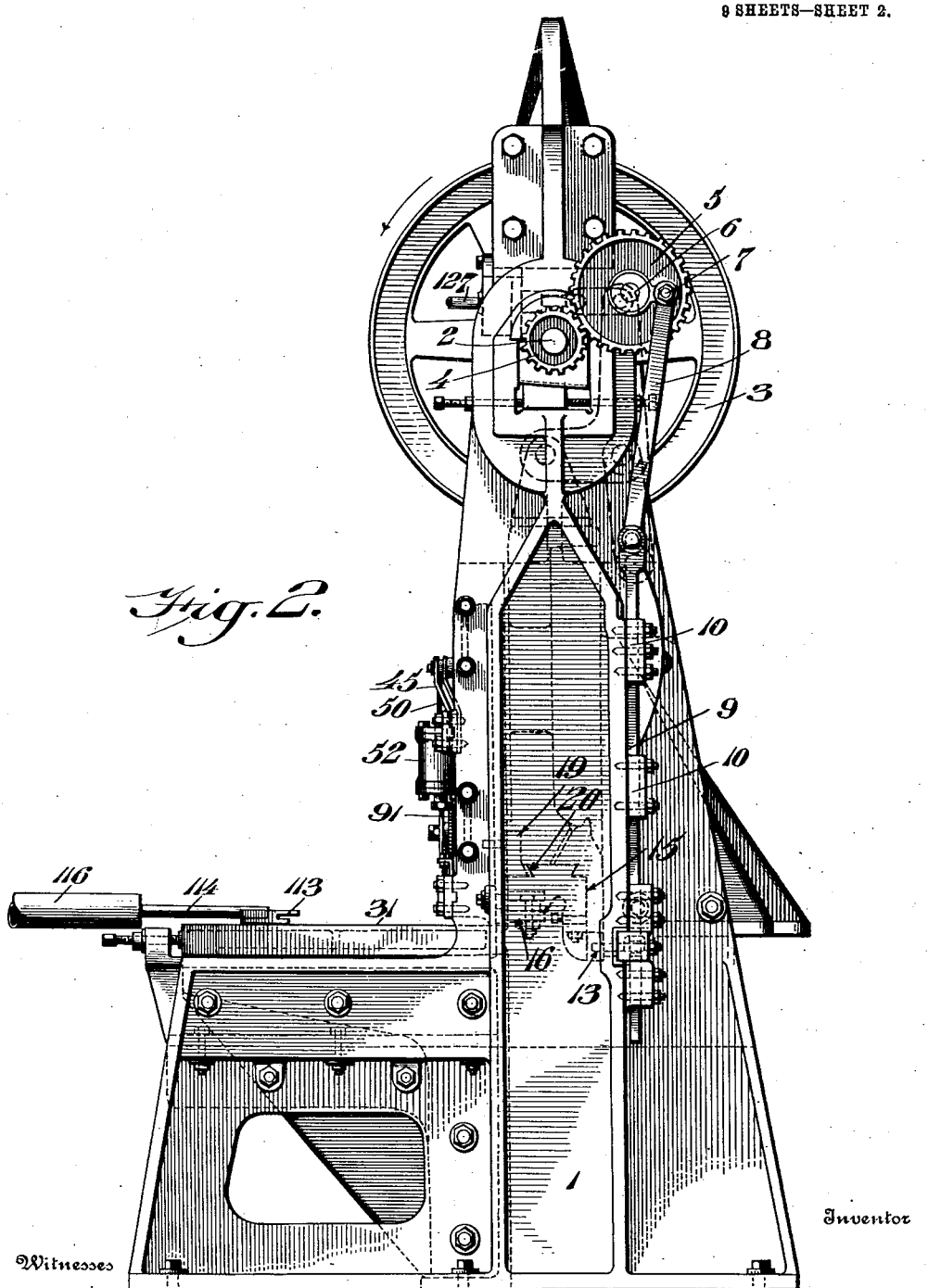

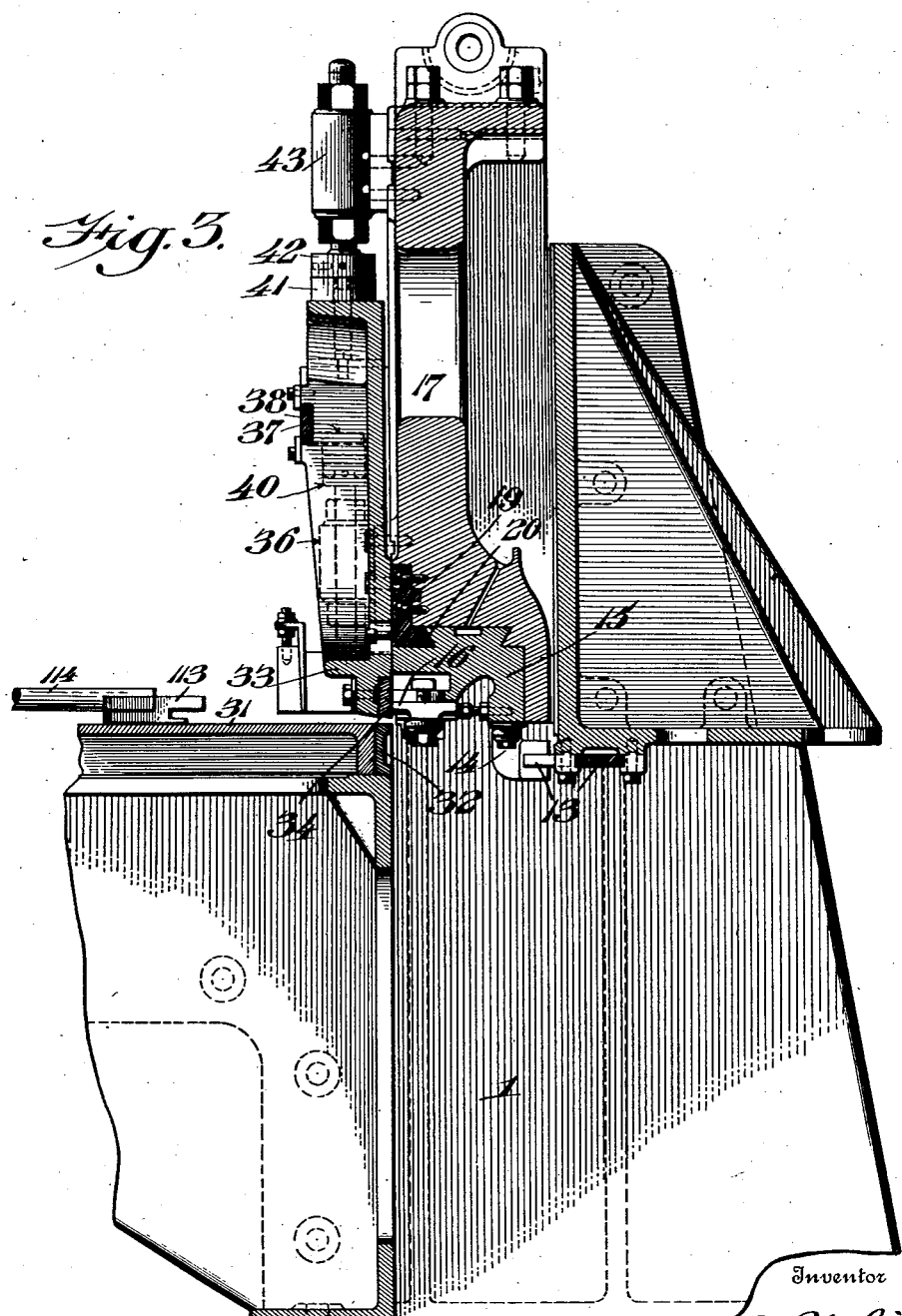

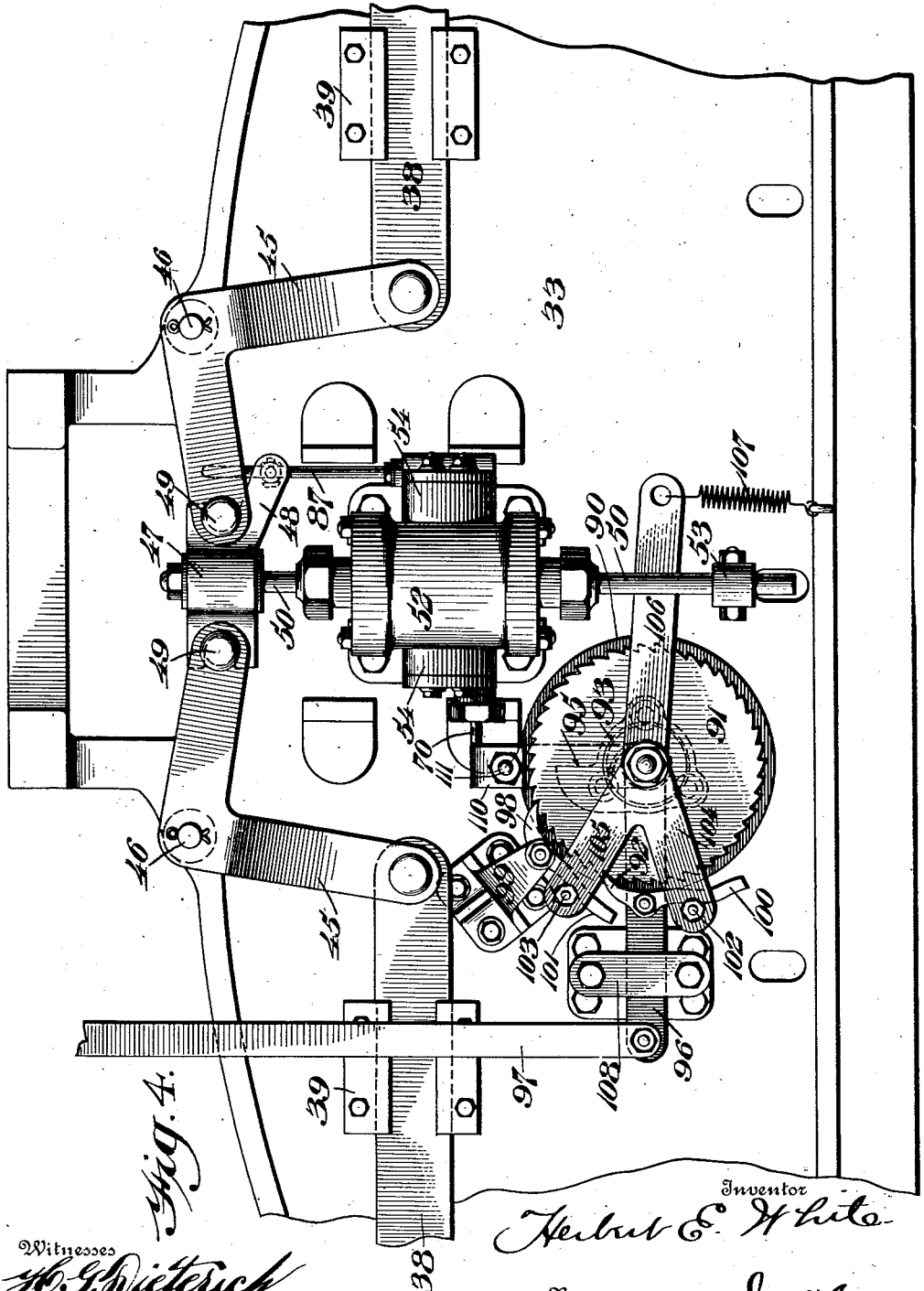

H. E. WHITE.
ATTACHMENT FOR DIAMOND LATH MACHINES.
APPLICATION FILED SEPT. 15, 1908.

919,274.

Patented Apr. 20, 1909.
9 SHEETS—SHEET 5.

Witnesses

Inventor
Herbert E. White.

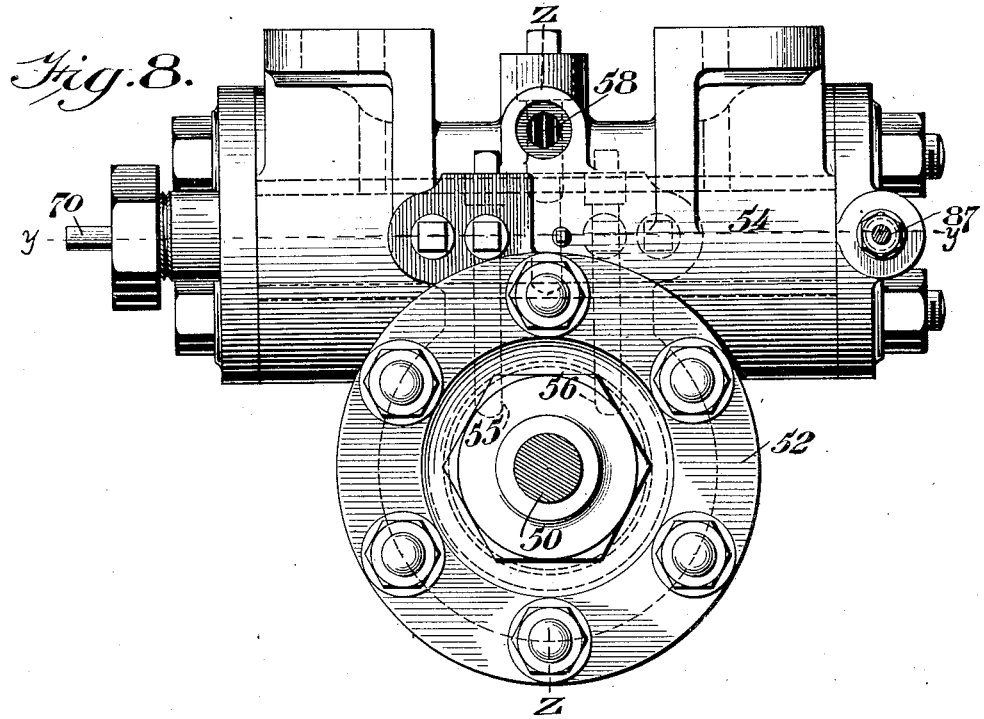
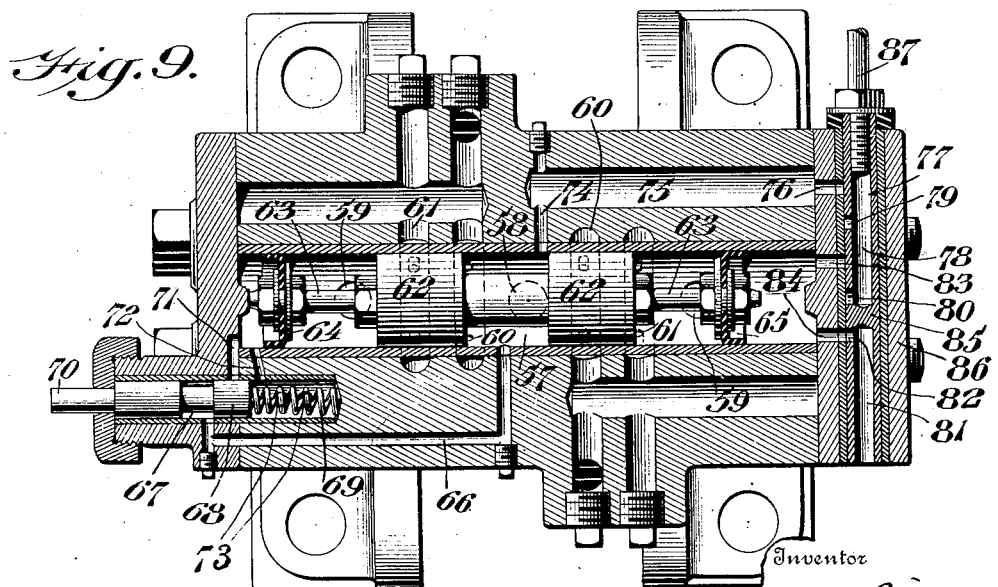

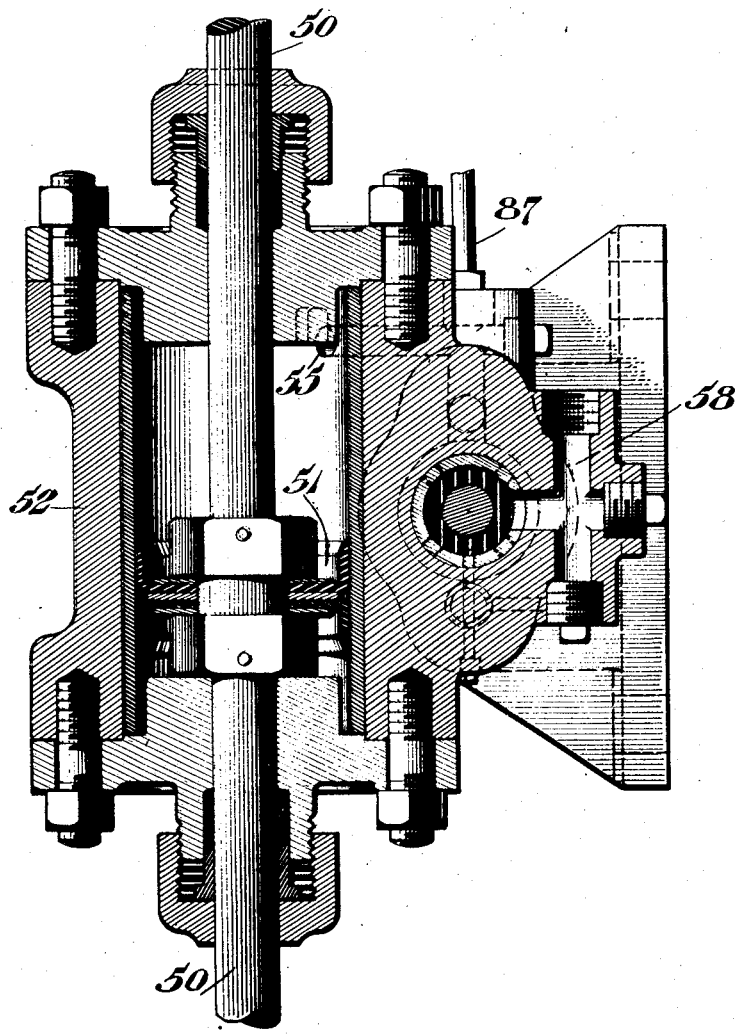

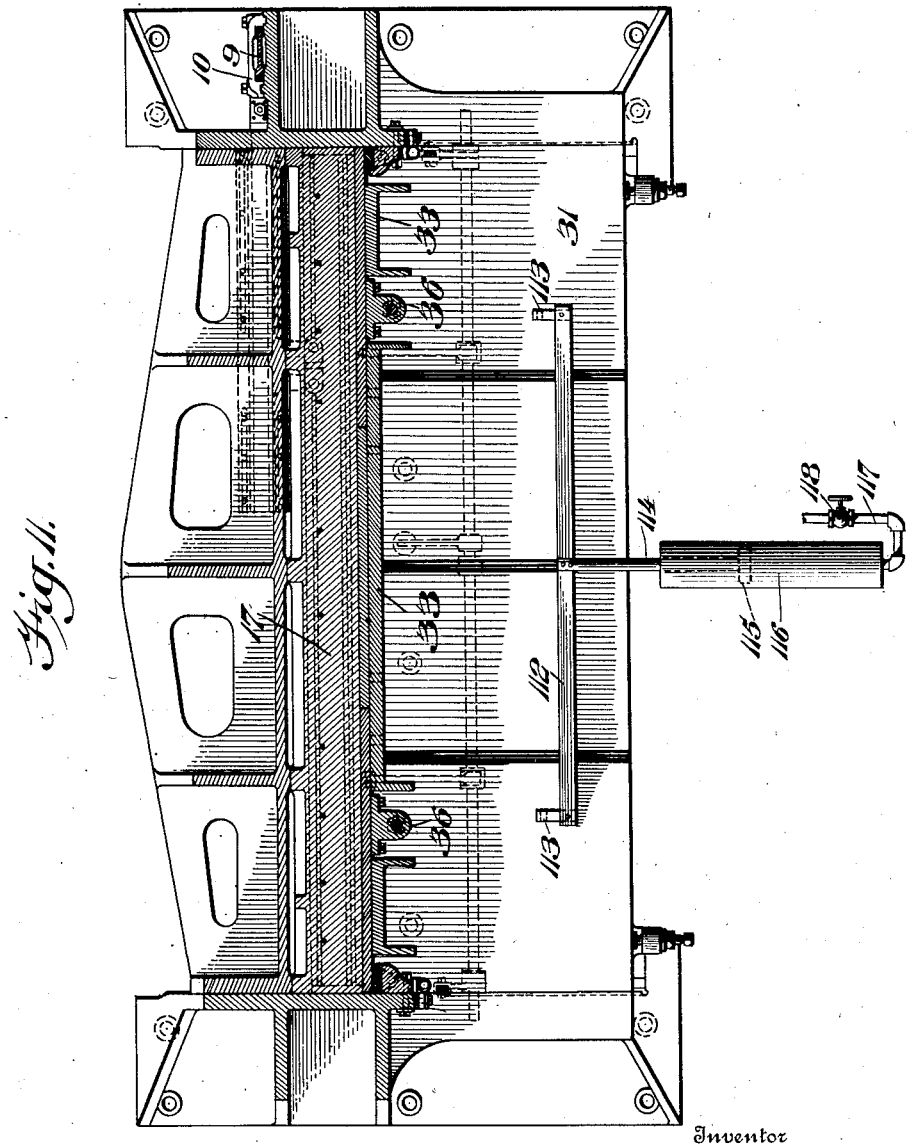

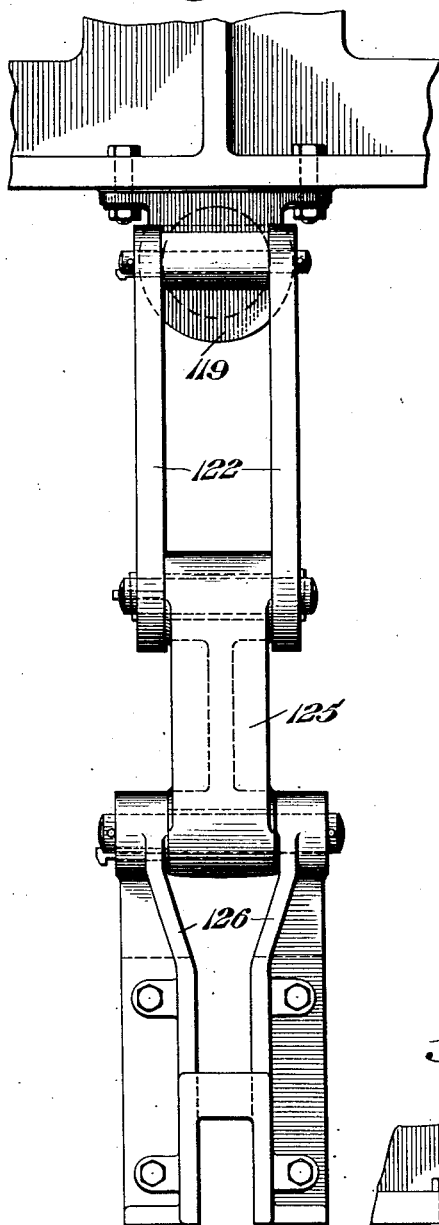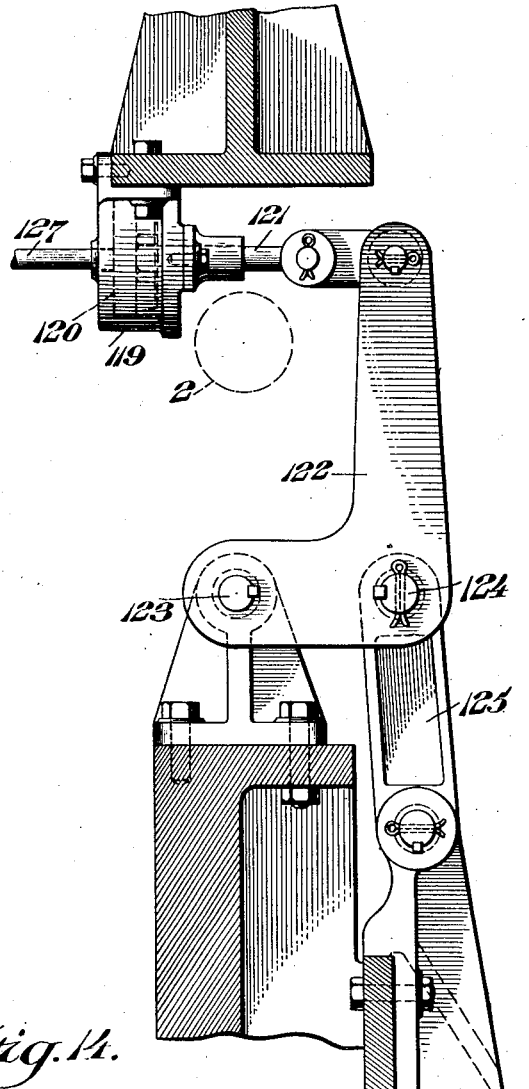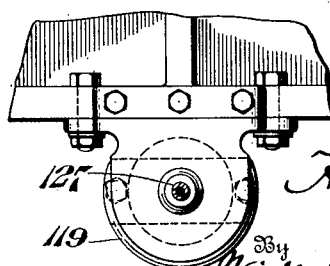

UNITED STATES PATENT OFFICE.

HERBERT E. WHITE, OF YOUNGSTOWN, OHIO, ASSIGNOR TO THE GENERAL FIREPROOFING COMPANY, OF YOUNGSTOWN, OHIO, A CORPORATION OF OHIO.

ATTACHMENT FOR DIAMOND LATH-MACHINES.

No. 919,274.      Specification of Letters Patent.      Patented April 20, 1909.

Application filed September 15, 1908. Serial No. 453,093.

*To all whom it may concern:*

Be it known that I, HERBERT E. WHITE, a citizen of the United States, residing at Youngstown, Mahoning county, State of Ohio, have invented a new and useful Attachment for Diamond Lath-Machines, of which the following is a specification.

This invention relates to a machine for producing expanded sheet metal wherein a series of cutters are operated to cut a row of slots in a piece of sheet metal and are then moved so that, when the material has been fed forward a suitable distance, on the next cutting stroke a row of slots is cut just back of the portions unsevered at the previous operation and has for an object to provide an automatic controlling mechanism whereby the expanded portion of the material may be cut off at a predetermined time so as to allow free continuous running of the machine without constant attention.

Another object is to provide a means whereby the time of operation of the automatic controlling mechanism may be adjusted so that different lengths or widths of material may be cut as desired, a very essential feature where the making of metallic laths is concerned, since they should all be of approximately uniform width.

A further object is to provide a novel type of feeding mechanism operating in conjunction with the automatic controlling means whereby the material is always maintained in position to be operated upon by the series of cutters.

A still further object is to provide a counterbalance which tends to take up and relieve the strain on the working parts due to the reciprocation of the heavy masses which comprise the main operating parts.

It further consists of other novel features of construction, all as will be hereinafter fully set forth.

For the purpose of illustrating my invention, I have shown the preferred form used by me which has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 6:
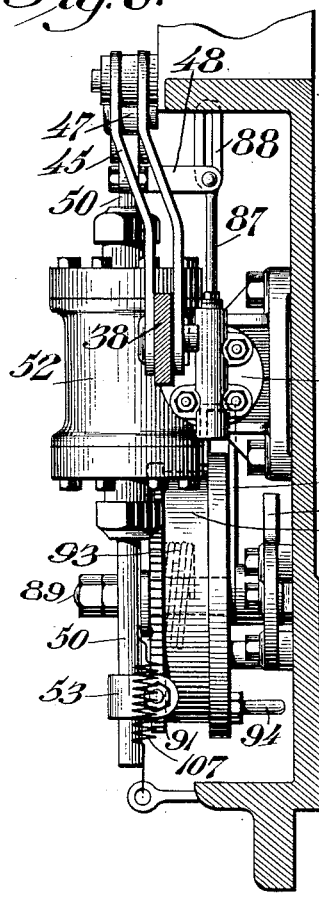
Figure 5:
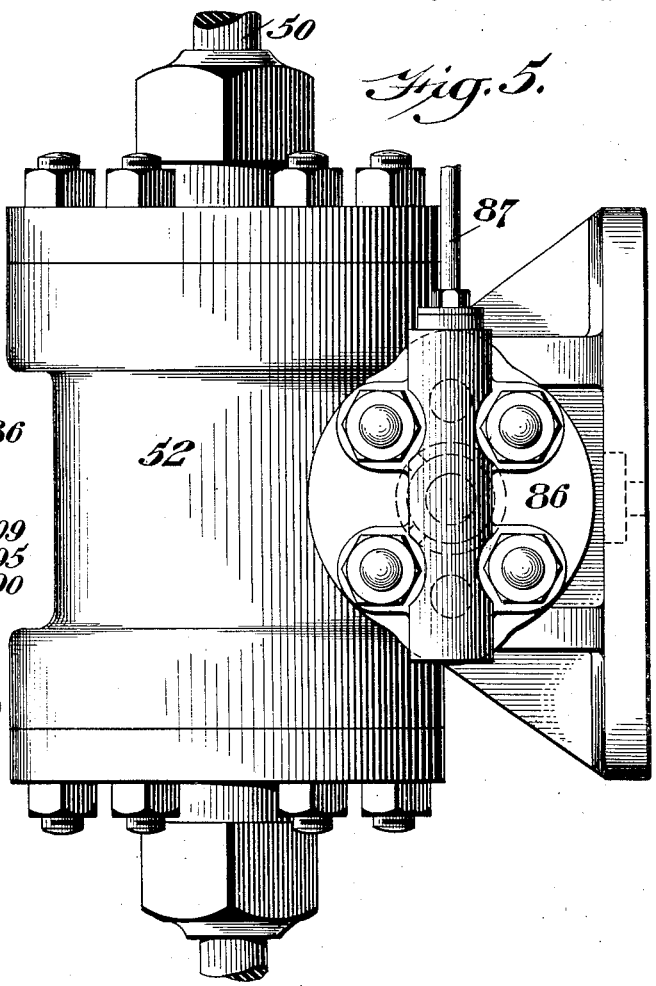
Figure 7:
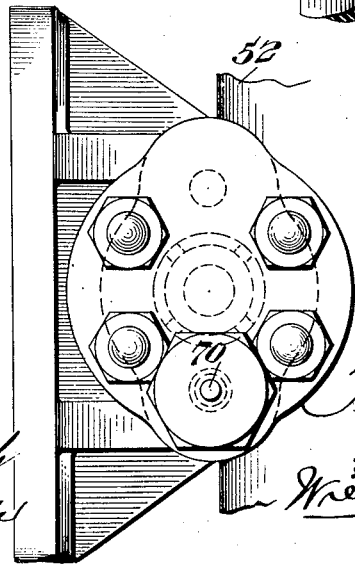

Figure 1 represents a side elevation of a machine embodying my invention. Fig. 2 represents an end elevation of the same. Fig. 3 represents a vertical section on line *x—x* Fig. 1. Fig. 4 represents the automatic feed mechanism. Fig. 5 represents a side elevation of the feed operating cylinder with adjacent parts removed. Fig. 6 represents a side elevation of the feed operating cylinder with adjacent parts in position. Fig. 7 represents an end elevation of the valve chest for the feed operating cylinder. Fig. 8 represents a plan view of the feed operating cylinder and valve chest. Fig. 9 represents a section on line *y—y* Fig. 8. Fig. 10 represents a section on line *z—z* Fig. 8. Fig. 11 represents a plan of the table of the machine showing the feed mechanism. Fig. 12 represents a detached view of the counterbalance mechanism. Fig. 13 represents a side elevation of the same. Fig. 14 represents an end view of the counterbalance cylinder.

Similar numerals of reference indicate corresponding parts in the figures.

Referring to the drawings. 1 designates the frame of a suitable machine embodying my invention having journaled therein, in any operative manner, a driving shaft 2 carrying a pulley 3 which receives power from any suitable source and transmits the same to the shaft 2 and the working parts of the machine. A gear 4 is mounted on the shaft 2 in such a manner as to rotate therewith and meshes with a pinion 5 carried by a shaft 6 which is journaled in suitable bearings on the frame 1.

7 designates a crank secured preferably to the shaft 6 to which a connecting rod 8 is fastened and joins the same to a bar 9 adapted to operate in guides 10 of the frame 1, whereby upon rotation of the pinion 5 the bar 9 receives a reciprocating movement in the guides 10. At a suitable point the bar 9 is provided with a cam slot 11 adapted to receive a coöperating cam roller 12 attached to which is a cross-bar 13 serving to actuate the cutting mechanism at certain intervals. This cross-bar 13 is provided with slots (not illustrated) adapted to receive extensions 14 which are secured in any suitable manner to a carriage 15. It will be clear that as the bar 9 slides back and forth the cam slot 11 engages the roller 12 and causes the reciprocation of the bar 13, by means of which the extensions 14 are operated to shift the carriage 15.

The carriage 15 is, in the present instance, detachably connected to a ram or press 17 by suitable means allowing sliding movement and with which it is retained in position by a bolted plate 19 having a liner 20 located between the parts to take up wear, due to the reciprocation of the carriage 15. The press 17, which operates the carriage 15 and the upper series of cutters 16, consists of a cross-head adapted to slide in guides 21 secured to the frame 1 and is raised and lowered by means of eccentrics 22 mounted on the shaft 2, there being, of course, suitable connections between the press 17 and the eccentrics 22. In the present instance these connections comprise boxes 23 secured in any desired manner over the eccentrics 22 and provided with a threaded end 24 adapted to receive an adjusting screw 25 fitting in a similar threaded end 26 of a pivoted member 27 secured by the bolt 28 to a base 29 fastened to the press 17. The screw 25 is provided to allow of adjustment between these connecting parts and thus vary the position of the upper cutters 16. Preferably, this screw 25 has an enlarged portion 29′ provided with apertures in order that a wrench may be fitted thereover to operate the adjusting means. It is to be understood that the eccentrics 22 are maintained in correct position on the shaft 2 by suitable means, as the collars 30 bolted to the main frame 1 and which also serve as intermediate bearings for the shaft 2.

It will be clear that as the eccentrics 22 are rotated by the shaft 2 the press 17 will be raised and lowered in its guides 21 and carry with it, through the carriage 15, the upper cutters 16, which are also at a certain point in the travel of the press 17 shifted transversely through the cam slot connection 12 and the bar 13. This side movement of the cutters 16 is a very essential feature in this type of machine as the sheet metal material is first slotted by the cutters in one position and then as the cutters are withdrawn from operation the material is brought forward and the cutters shifted so that on the next downward movement a slit will be made in the material just back of the portions left unsevered at the preceding operation.

A table 31 is provided to receive the material which is fed by suitable feeding mechanism, to be hereinafter described, until it is positioned directly above a lower cutter bar 32 where it is securely held a certain length of time by a clamp 33 carrying clamp jaws 34. This clamp 33 is suitably held for sliding movement in the frame 1 by the guides 35 and is operated by the engagement of brackets 36 on press 17 with lugs 37 attached to or formed integral with cross-bars 38 mounted for reciprocation in guide lugs 39 of the clamp 33. The brackets 36 are preferably secured to the press 17 in order that the clamp lugs 37 may be engaged at the proper time to raise the clamp 33 and release the material so that the feeding mechanism may advance the material before the next stroke of the cutters. Plungers 40 are secured in the brackets 36 for the purpose of forming a contact surface and are preferably capable of adjustment to vary the movement of the clamp 33, whereby it is released from the material by the engagement of the plungers 40 with the lugs 37 at a different time in the stroke. As herein shown, this adjustment consists of mounting the plungers 40 upon a screw threaded rod operating in bracket 36. The plungers 40 are, in the present instance, apertured in order that a wrench may be fitted to adjust them to their correct position.

It will be noted that the lugs 37 are preferably of the same width as the diameter of the plungers 40, so that should the cross-bars 38 be moved one way or the other a sufficient distance, the plungers 40 in their upward movement will pass into a clearance space and therefore the clamp 33 will remain in stationary position. The clamp 33 is returned to its normal position preferably by gravity but in order to firmly grip and hold the sheet metal material during the cutting operation, it has suitable means mounted thereon which are adapted to be engaged by a portion of the press 17 to force the clamp 33 against the material. In the present instance this means consists of abutments 41 located in the path of plungers 42 which are adjustably secured in brackets 43 suitably attached to the press member 17. These plungers 42 are provided with the same kind of adjusting means as that described for the plungers 40 and operate substantially the same.

The cross bars 38 are adapted for sliding movement in lugs 39 and are suitably operated as by the bell cranks 45, the ends of which are so connected as to give a like movement to both cross-bars 38. These bell cranks 45 are fulcrumed to the clamp 33 on pins 46 and are preferably mutually operated by a yoke 47 to which they are bolted or otherwise secured. As herein shown, the yoke 47 is provided with recesses adapted to receive bolts 49 which pass through openings in the bell cranks 45.

48 designates an extension of the yoke 47 for a purpose to be hereinafter described.

The yoke 47 is attached to a piston rod 50 carrying a piston 51 within a cylinder 52 and having an extension on which is fastened a trip finger 53. A valve chest 54 is secured to the cylinder 52 and communicates by ports 55 and 56 with the interior thereof, one being above the piston 51 and the other below, so as to form a double acting engine. The cylinder 52 and the valve chest 54, in the present instance, are suitably mounted on the clamp 33. The valve chest 54 consists of a valve bore 57 provided with an admission opening 58 and exhaust openings 59 and having also admission ports 60 and exhaust ports 61 communicating with the ports 55 and 56, all of which openings and ports are controlled by a double piston valve 62 having extensions 63 carrying pistons 64 and 65. The admission opening 58 communicates with a space between the two pistons of the valve 62, which is connected through a bypass 66 with a valve chamber 67 containing a valve 68 which is normally held closed by a spring 69 and is opened by any suitable means acting on the stem 70 extending exterior of the valve casing. When this valve 68 is open it establishes a free passage for the motive fluid from the bypass 66 to a port 71 leading to the space back of the piston 64, which space is also provided with a passage 72 communicating with exhaust ports 73 when the valve 68 is closed.

74 designates a port connecting the space between the two pistons of the valve 62 with a bore 75 which terminates in a port 76 controlled by a slide valve sleeve 77 having a bore 78, provided with ports 79 and 80, and a bore 81 provided with a port 82. The ports 79, 80 and 82 are adapted through movement of the valve sleeve 77 to aline respectively with ports 76, 83 and 84, the two latter communicating with the space back of the piston 65. The bores 78 and 81 are separated by a division wall 85. Of course it will be understood that various types of valve structure may be used to control the admission of motive fluid to the cylinder 52, the one above described being the preferred form for carrying out the several steps.

The valve sleeve 77 mounted for sliding movement in a casing 86 suitably secured to the valve chest 54 and is operated by a rod 87 having a lost motion connection, in the shape of a link 88, with the arm 48. Thus it will be seen that as the piston rod 50 moves up and down it will, at certain portions of its stroke, pick up the link 88 on the rod 87 and thereby shift the valve sleeve 77 to move the several ports 79, 80 and 82 to either admit or exhaust the motive fluid from the end of the valve bore 57.

In the present instance the piston 51 is operated by air pressure which enters the cylinder 52 alternately on either side of the piston 51 and is controlled by the operation of the double piston valve 62 and auxiliary slide valve 77.

The operation of this valve structure is as follows:—it being understood that the parts are assumed to be in the position illustrated in Fig. 9. Upon the valve 68 being operated by engagement of certain means, to be hereinafter described, with the stem 70, communication is established from the air inlet 58 by way of the bypass 66 through the port 71 to the space back of the piston 64 where the pressure acts to shift the double piston valve 62 to the right uncovering the ports 60 and 61. The air now has free passage from the inlet 58 through the port 60 to the admission port 56 from which it enters the cylinder 52 below the piston 51. At this time the port 55 is exhausting the space above the piston 51 through the port 61 and outlet 59. When the piston 51 is raised to the end of its stroke the extension arm 48 picks up the link 88 and through the rod 87 shifts the valve sleeve 77 so that the ports 79, 80 and 82 aline respectively with the ports 76, 83 and 84. Communication has now been established from the inlet 58 by way of the ports 74, bore 75, ports 76 and 79, bore 78, ports 80 and 83 with the space back of the piston 65 whereupon the pressure returns the double piston 62 to its former position. The pressure back of the piston 64 has been relieved in the meantime by the closing of the valve 68 and the opening of port 72 to the exhaust passages 73. The air now has access to the cylinder 52 above piston 51 through ports 60 and admission port 55 and the piston 50 returns thereby operating the extension arm 48 to move the slide valve 76 back again to normal.

The operation of the valve 68 may be controlled by any suitable means which will engage the stem 70 at a predetermined time and allow admission of the motive fluid. In the preferred form a bolt 89 is secured to the clamp 33 adjacent the cylinder 52 and forms a pivot for drum 90 carrying a ratchet wheel 91 which is operated in one direction by a pawl 92 and is returned and held in normal position by means of a coil spring 93 mounted interiorly of the drum 90. The return movement of the drum 90 is limited by the engagement of a pin 94 secured to the drum 90 with a stop 95 mounted upon the clamp member 33. A lever 96 is pivoted upon the bolt 89 and has secured thereto the pawl 92 located in a suitable position for engagement with the teeth of the ratchet wheel 91.

97 designates a rod connecting the arm 96 with the movable press 17 so that each reciprocation of the press raises and lowers the arm 96 therewith and consequently advances the ratchet wheel 91 through the movement of the pawl 92, which is suitably pivoted to the arm 96. In order to maintain the ratchet wheel from reverse movement during the downward movement of the arm 96 a locking pawl 98 is pivoted in bracket 99, which is suitably fastened on the clamp 33 and serves to maintain the pawl 98 in the path of the teeth of the ratchet wheel 91.

It will be noted that both of the pawls 92 and 98 are provided with extensions 100 and 101 forming a cam surface thereon which is located in the path of trip fingers 102 and 103 which are attached respectively to the arms 104 and 105 of the pivoted lever 106. The lever 106 is normally held by spring 107 so that the trip fingers 102 and 103 are out of engagement with the extensions 100 and 101 but when the trip finger 53 moves upward to engage the arm 106, as it does when the piston rod is operated, they will be brought down to raise the pawls 92 and 98 out of engagement with the teeth of the ratchet wheel 91, whereupon the coil spring 93 immediately turns the drum 90 in a reverse direction and brings it back to normal position with the pin 94 resting upon stop 95.

The lever arm 96 is maintained in correct relation to the ratchet wheel 91 by means of a bracket guide 108 secured to the clamp 33 whereby it always holds the pawl 92 in alinement with the teeth of the drum 90, so that the latter is advanced one tooth at each upward movement of the lever arm 96.

109 designates a trip arm pivoted upon the bolt 89 and adapted to be secured to the drum 90 at any suitable portion of the circumference thereof, whereby the time of its engagement with the stem 70 of the valve 68 may be varied, as desired. In the preferred form this trip arm extends upwardly, so as to include the valve stem 70 in its path of movement, and is provided with a depending portion 110, so that the edge of the drum 90 extends between the two parts of the trip arm and may be held fast therebetween by means of a bolt 111. It will be apparent by loosening this bolt 111 that the arm 109 may be moved from one point to another on the circumference of the drum 90 and thereby alter the time at which it contacts with the valve stem 70. As the drum 90 is rotated step by step, it will be seen that the trip arm is carried around with it each movement of the ratchet wheel, bringing the trip arm one tooth nearer the valve stem 70 and upon the said trip arm 109 engaging and operating the valve stem 70, the pawls 92 and 98 controlling the ratchet wheel 91 will immediately be released from engagement therewith and the spring 93 within the drum 90 then returns the drum to normal position carrying with it the trip arm 109.

In order to properly advance and feed the material to the machine a feed bar 112 is suitably positioned upon the table 31 and has secured thereto holding fingers 113 adapted to extend over the top of the material and prevent its displacement during the feeding operation. Attached to the bar 112 is a piston rod 114 carrying on the end thereof a piston 15 which operates within a cylinder 116 that is adapted to receive air or other motive fluid through a connecting pipe 117 controlled by a valve 118. It will thus be clear that there is a contact pressure upon the sheet metal material upon the table 31 which tends to force it into position beneath the cutters and at each release of the clamp 33 the material advances to a new position.

In order to counterbalance the weight of the press 17, a cylinder 19 is secured to the main frame 1 and carries therein a piston 120 attached by piston rod 121 to the bell cranks 122, one end of which is attached to the press 17 by suitable means as the bolt 123, while the fulcrum 124 is fastened by a link 125 to a support 126 suitably mounted on the main frame 1 of the machine.

An air supply 127 leads to the interior of the cylinder 119 and maintains therein a constant pressure against the piston so that it will be seen that the tendency of the bell cranks 122 is to lift the press 17 and thus substantially balance the weight of the same.

The operation of the machine is as follows:—A piece of sheet metal material is placed upon the table 31 with the feed fingers 113 engaging its outer edge and air under pressure is then admitted to the cylinder 116 to advance the piston rod 114 to move bar 112 forward and carry the material beneath the clamp 33. The shaft 2 having been started in operation rotates the eccentrics 23 and through them causes the reciprocation of the press 17 and as the cutters 16 are connected to the press 17 by means of the carriage 15, they are also given a similar movement. As the material is now in place beneath the cutters 16 a plurality of slots will be cut the entire length of the material on the downward stroke of the cutters 16 and then as the press 17 returns on the up stroke, the brackets 36 and plungers 40 pick up the lugs 37 and raise the clamp 33, so that the material may be advanced far enough for a second row of slots. While the cutters 16 are withdrawn from the material the movement of the bar 9 engages the cam slot 11 with the roller 12 and through the connections already described brings the cutters a sufficient distance to one side to make the next slit in the material just back of the part left unsevered at the preceding operation. This operation is repeated at each reciprocation of the press 17, the material being advanced and severed by the cutters 16 until finally it reaches the length desired, when the slotted portion is cut from the remaining part of the material. This cutting off operation takes place at any predetermined time by any novel construction disclosed in the several figures, wherein the trip arm 109 is set at a certain point on the circumference of the drum 90 so that when the drum has rotated sufficiently to bring the arm 109 into engagement with the valve stem 70, the material will have reached the cutting off point. It will be seen that each reciprocation of the press 17 carries the rod 97 with it so that the arm 96 advances the ratchet wheel 91 by means of the pawl 92, the length of one tooth, thus carrying the arm 109 step by step nearer the valve stem 70. As soon as the valve stem 70 is engaged by arm 109, the motive fluid will be admitted to the cylinder 52 as already described, and the piston rod 50 operated to turn the bell cranks 45 and thereby slide the bars 38 so that the lugs 37 thereon will be moved out of the path of the plungers 40. As soon as these lugs are moved to one side the upward movement of the press 17 will have no effect whatsoever upon the clamp 33 in view of the fact that the plungers 40 pass into the clearance space and therefore the material will be held clamped in the same position as when engaged by the cutters on the last downward stroke, and since now the cutters have been shifted directly over the unsevered portions, the next downward movement will completely sever the expanded portion from the remaining material.

Having thus described my invention what I claim as new and desire to secure by Letters Patent, is:—

1. In a machine of the character described, a plurality of cutters, a press operating said cutters, means exerting a constant feed pressure on a strip of material, and automatic means to overcome said pressure and prevent feeding of said strip.

2. In a machine of the character described, a plurality of cutters, a press operating said cutters, a clamping member adapted to move with said press, a feed mechanism, and means to permit a full stroke of said press and to maintain said clamp stationary.

3. In a machine of the character described, a plurality of cutters, a press operating said cutters, lugs on said press, a clamp adapted to be engaged by said lugs, and means to disengage said lugs from said clamp during a full stroke of said press.

4. In a machine of the character described, a plurality of cutters, a press operating said cutters, lugs on said press, a clamp adapted to be engaged by said lugs, and automatic means to disengage said lugs from said clamp during a full stroke of said press.

5. In a machine of the character described, a plurality of cutters, a press operating said cutters, lugs on said press, a clamp, lugs on said clamp located in the path of said press lugs, and means to shift one set of said lugs, whereby said clamp remains stationary during a full stroke of said press.

6. In a machine of the character described, a plurality of cutters, a press operating said cutters, lugs on said press, a clamp, lugs on said clamp located in the path of said press lugs, and means to shift one set of said lugs at a predetermined time, whereby said clamp remains stationary during a full stroke of said press.

7. In a machine of the character described, a plurality of cutters, a press operating said cutters, lugs on said press, a clamp, a sliding bar secured to said clamp, lugs on said sliding bar located in the path of said press lugs, and means to shift said bar at a predetermined time whereby said press lugs move into a clearance space.

8. In a machine of the character described, a plurality of cutters, a press operating said cutters, lugs on said press, a clamp, a sliding bar secured to said clamp, lugs on said sliding bar located in the path of said press lugs, and automatic means to shift said bar at a predetermined time whereby said press lugs move into a clearance space.

9. In a machine of the character described, a plurality of cutters, a press operating said cutters, lugs on said press, a clamp, a plurality of sliding bars secured to said clamp, lugs on said sliding bars located in the path of said press lugs, and means to shift said sliding bars at a predetermined time, whereby said press lugs operate in a clearance space.

10. In a machine of the character described, a plurality of cutters, a press operating said cutters, lugs on said press, a clamp, a plurality of sliding bars secured to said clamp, lugs on said sliding bars located in the path of said press lugs, and pneumatic means operating said sliding bars at a predetermined time, whereby said press lugs operate in a clearance space.

11. In a machine of the character described, a plurality of cutters, a press operating said cutters, lugs on said press, a clamp, a plurality of sliding bars secured to said clamp, lugs on said sliding bars located in the path of said press lugs, and pneumatic means operating automatically to slide said bars at a predetermined time, whereby said press lugs operate in a clearance space.

12. In a machine of the character described, a plurality of cutters, a press operating said cutters, lugs on said press, a clamp, lugs thereon located in the path of said press lugs, a drum secured to said clamp, means to rotate said drum, a trip arm secured to said drum and means engaged thereby to shift one set of lugs.

13. In a machine of the character described, a plurality of cutters, a press operating said cutters, lugs on said press, a clamp, lugs thereon located in the path of said press lugs, a drum secured to said clamp, means to rotate said drum, a trip arm adjustably secured to said drum, and means engaged thereby to shift one set of lugs.

14. In a machine of the character described, a plurality of cutters, a press operating said cutters, lugs on said press, a clamp, lugs thereon, located in the path of said press lugs, a drum secured to said clamp, a ratchet on said drum, a pawl operated by said press to rotate said ratchet, a trip arm adjustably secured to said drum, and means engaged thereby to shift one set of lugs.

15. In a machine of the character described, a plurality of cutters, a press operating said cutters, a clamp, sliding bars secured thereto, a pisiton rod connected to said sliding bars, a piston on said piston rod, a cylinder inclosing said piston, a valve controlling the admission of motive fluid to said cylinder, and means operating said valve at a predetermined time to reciprocate said bars.

16. In a machine of the character described, a plurality of cutters, a press operating said cutters, a clamp, sliding bars secured thereto, a piston rod connected to said sliding bars, a piston on said piston rod, a cylinder inclosing said piston, a valve controlling the admission of motive fluid to said cylinder, a drum adjacent said cylinder, an arm on said drum adapted to engage said valve at a predetermined time, and means to rotate said drum.

17. In a machine of the character described, a plurality of cutters, a press operating said cutters, a clamp, sliding bars secured thereto, a piston rod connected to said sliding bars, a piston on said piston rod, a cylinder inclosing said piston, a valve controlling the admission of motive fluid to said cylinder, a drum adjacent said cylinder, an adjustable arm on said drum adapted to engage said valve at a predetermined time, and means to rotate said drum.

18. In a machine of the character described, a plurality of cutters, a press operating said cutters, a clamp, sliding bars secured thereto, a piston rod connected to said sliding bars, a piston on said piston rod, a cylinder inclosing said piston, a valve controlling the admission of motive fluid to said cylinder, a drum secured to said clamp adjacent said cylinder, a trip arm secured to said drum adapted to engage said valve, a reciprocating lever operating said drum, and means to return said trip arm to normal position.

19. In a machine of the character described, a plurality of cutters, a press operating said cutters, a clamp, sliding bars secured thereto, a piston rod connected to said sliding bars, a piston on said piston rod, a cylinder inclosing said piston, a valve controlling the admission of motive fluid to said cylinder, a drum secured to said clamp adjacent said cylinder, a reciprocating lever, a pawl and ratchet connection between said drum and lever, a cam extension on said pawl, a lever engaging said cam to disconnect said pawl, and means on said piston rod for operating said lever.

20. In a machine of the character described, a plurality of cutters, a press operating said cutters, lugs on said press, a clamp, lugs on said clamp, normally located in the path of the said press lugs, and means to shift one set of lugs at a predetermined time, whereby the two sets can freely pass each other.

21. In a device of the character described, a plurality of cutters, a press operating said cutters, lugs on said press, a clamp, lugs on said clamp adapted, when said clamp is elevated, to engage with said press lugs, and means whereby at a predetermined time said lugs can freely pass each other.

HERBERT E. WHITE.

Witnesses:
P. D. KAISER,
H. R. GLENN.